United States Patent [19]
Pera

[11] Patent Number: 5,415,192
[45] Date of Patent: May 16, 1995

[54] CLEANING DEVICE FOR A MILKING PLANT

[75] Inventor: Anne Pera, Emmeloord, Netherlands

[73] Assignee: Gascoigne-Melotte B.V., Emmeloord, Netherlands

[21] Appl. No.: 168,453

[22] Filed: Dec. 16, 1993

[30] Foreign Application Priority Data

Jan. 8, 1993 [NL] Netherlands ............ 9300039

[51] Int. Cl.⁶ ............................................. B08B 9/06
[52] U.S. Cl. ................... 134/104.1; 134/167 C; 134/167 R; 134/169 C; 141/91
[58] Field of Search ............ 134/104.1, 166 C, 169 C, 134/168 C, 167 C, 172, 181, 167 R; 141/91

[56] References Cited

U.S. PATENT DOCUMENTS

| | | | |
|---|---|---|---|
| 2,733,667 | 2/1956 | Hill | 134/169 C X |
| 2,800,134 | 7/1957 | Merritt | 134/168 C X |
| 2,878,819 | 3/1959 | Thomas | 134/169 C X |
| 2,897,829 | 8/1959 | Arrington et al. | 134/169 C |
| 3,067,756 | 12/1962 | Bruggink | 134/169 C X |
| 3,119,400 | 1/1964 | Bihler | 134/169 C X |
| 3,417,763 | 12/1968 | Fjermestad | 134/169 C |
| 4,543,494 | 8/1985 | Hautemont | 141/91 X |
| 5,095,958 | 3/1992 | Tincati | 141/91 |
| 5,313,990 | 5/1994 | Clusserath | 141/91 X |

FOREIGN PATENT DOCUMENTS 97222 3/1961 Netherlands.

*Primary Examiner*—Frankie L. Stinson
*Attorney, Agent, or Firm*—Buchanan Ingersoll; Michael L. Dever

[57] ABSTRACT

A cleaning device for a liquid treatment plant comprises a tank and also a pressure line for the supply of the liquid to the tank. The pressure line has a nozzle which can be moved between a position in which it is connected to the filling aperture of the tank and a position not connected to the filling aperture, and also comprises means for periodic cleaning of the pressure line. In order to avoid mistakes in the connection, a return line for returning a cleaning fluid supplied through the pressure line is provided with a connecting piece which can be connected on the one hand to the nozzle of the pressure line removed from the filling aperture, in order to form a flow connection between pressure line and return line, and which can be connected on the other hand to the filling aperture, in order to shut it off.

13 Claims, 3 Drawing Sheets

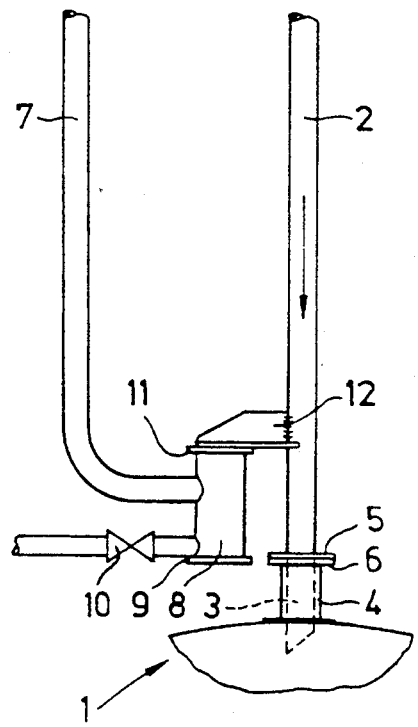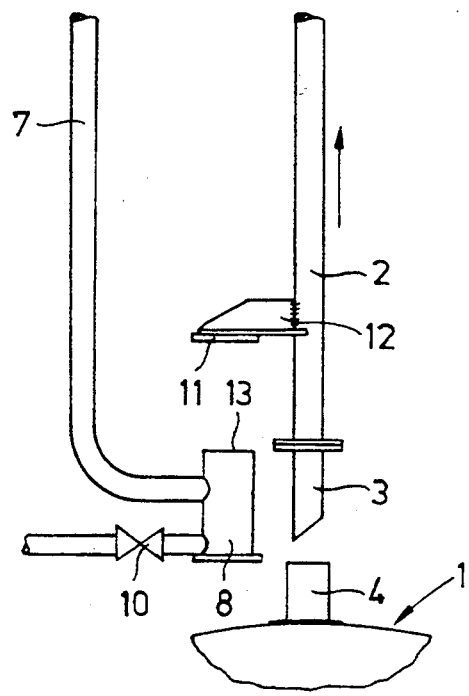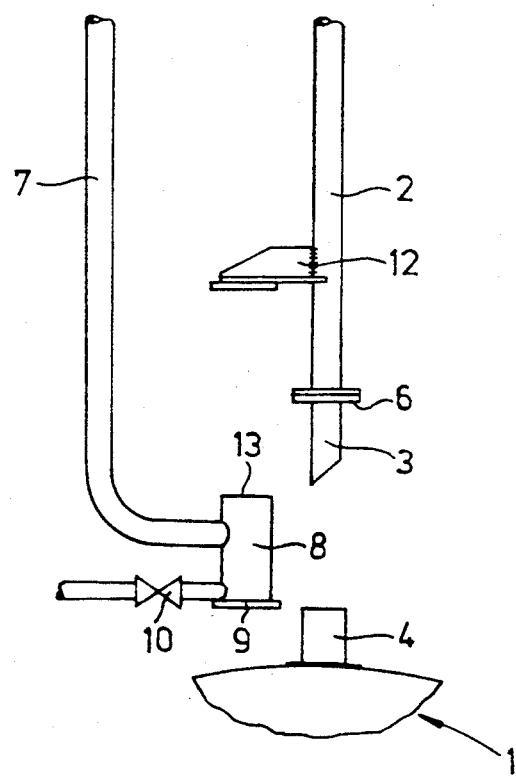

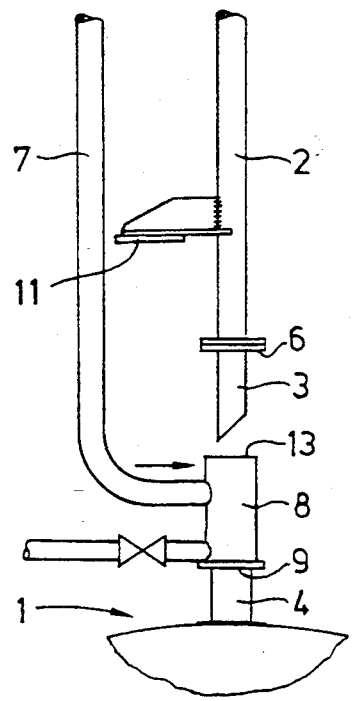
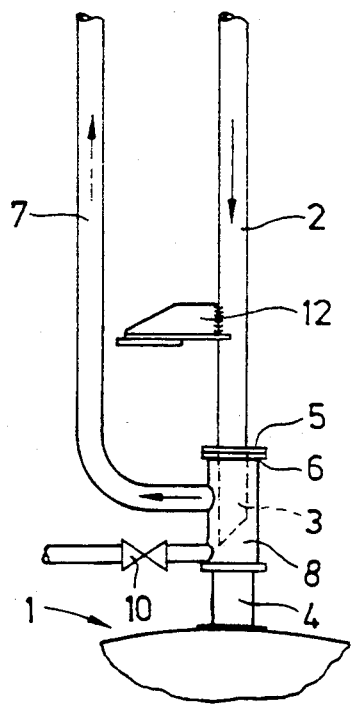

CLEANING DEVICE FOR A MILKING PLANT

The invention relates to a cleaning device for a liquid treatment plant, which plant comprises a tank and also a pressure line for the supply of the liquid to the tank, which pressure line has a nozzle which can be moved between a position in which it is connected to the filling aperture of the tank and a position not connected to the filling aperture, and also comprises means for periodic cleaning of the pressure line. An example of such a plant in which such a cleaning device can be used is a milking plant.

In dairy farming the cows are generally milked 2 or 3 times a day. After each milking, thus also 2 or 3 times a day, all parts of the milking plant which come into contact with milk are cleaned. For this purpose, a cleaning fluid is sucked into the milking plant under the influence of the vacuum also used for the milking. The cleaning fluid is then conveyed from the air separator through the pressure line. The cleaning fluid passes through the pressure line into a collection reservoir, from where it may or may not be passed through the milking plant again.

In general, a milking plant comprises a cooling tank for the milk. In a cleaning operation, the lines of the milking plant are cleaned separately from the cooling tank. This means that the pressure line must be detached from the cooling tank. It is subsequently generally connected to a hose, which is hung in a collection reservoir.

Moreover, the cleaning is carried out in various phases. First of all, the plant is pre-flushed with, for example, tepid water, in order to remove milk residues from the plant. This pre-flushing phase is of short duration: the water is passed through the plant only once.

Hot water at, for example, 90 degrees Celsius, containing a cleaning agent, is then passed through the plant. This fluid is circulated several times, and this phase is therefore of longer duration. Finally, the plant is rinsed, in order to remove the last residues of cleaning fluid.

In particular, in the case of milking robots, which make it possible to milk continuously, the cleaning process must be carried out automatically. Since in the case of such milking robots a control device is already present for automatic control of the milking process, there is a need for a cleaning device which operates fully automatically.

The object of the invention is therefore to provide a plant in the case of which automatic cleaning is possible. This object is achieved through the fact that a return line for returning a cleaning fluid supplied through the pressure line is provided with a connecting piece which can be connected on the one hand to the nozzle of the pressure line removed from the filling aperture, in order to form a flow connection between pressure line and return line, and which can be connected on the other side to the filling aperture, in order to shut it off.

The return line can be connected permanently to a collection reservoir, which means that it is no longer necessary to fit and remove it by hand in each case. The connecting piece ensures that cleaning fluid does not accidentally go into the cooling tank; as soon as the pressure line is connected to the return line, access to the cooling tank is also blocked. All this is important for automatic milking, in the case of which there are no longer any operating personnel in the vicinity of the milking robot who would normally also have to connect and disconnect the cleaning device.

For this purpose, the nozzle of the pressure line is also bounded by an outward projecting ring which fits in a sealing manner, on the one hand, on a pipe section which forms the filling aperture and whose internal diameter is greater than the external diameter of the nozzle and, on the other hand, on the connecting piece connected to the return line.

The connecting piece is preferably in the form of a connecting pipe section whose internal diameter is greater than the external diameter of the nozzle, which connecting pipe section runs vertically, has an aperture at the top side, on which the ring fits in a sealing manner, and at the bottom side is shut off by a bottom plate which fits in a sealing manner on the pipe section forming the filling aperture.

In a practical embodiment, the pressure line, at least near the nozzle, is movable vertically between two positions, and the connecting pipe section is movable horizontally between a first position displaced relative to the pipe section forming the filling aperture and a position directly above that, in such a way that its bottom plate shuts off said pipe section.

In order to protect the connecting pipe section from dirt during milking, the pressure line is provided with an essentially horizontal cover plate projecting in the direction towards the connecting pipe section, which cover plate rests on the aperture at the top side of the connecting pipe section in the situation in which the nozzle is connected to the pipe section forming the filling aperture, and in which the connecting pipe section is situated in the first position, displaced relative to the filling aperture.

The return line is connected to the top half of the connecting pipe section. The nozzle of the pressure line can now be inserted into the connecting pipe section until it is past the connection to the return line. The advantage of this is that the cleaning fluid supplied through the pressure line is forced to flow upwards along the outside of the nozzle to the return line. The result of this is that the nozzle is also cleaned on the outside. As a result of the milk splashing during filling of the cooling tank, the outside of the nozzle in fact also comes into contact with the milk.

In order to be able to empty the connecting pipe section completely, it has a discharge valve connected directly above the bottom plate.

Provided at a fixed point above the cooling tank is a frame on which both the pressure line and the return line with connecting piece are slidably fitted. By means of suitable guides on the frame, pressure line and return line can be positioned correctly both relative to each other and relative to the cooling tank.

The frame preferably has a horizontal roller track on which a first auxiliary frame can be rolled by means of a piston-cylinder unit, on which first auxiliary frame the return line, the connecting piece and the discharge valve are fitted. The frame also has a vertical roller track on which a second auxiliary frame can be Polled by means of a piston-cylinder unit, on which second auxiliary frame the pressure line is fitted.

A control device can also be provided for automatic operation of the piston-cylinder units and the discharge valve. Such a control device can form part of the main control of a milking robot.

Although the use of the cleaning device is described above with reference to a milking plant, this device can also be used in the case of other plants, for example for the treatment of soft drinks, beef and the like.

The invention will be explained in greater detail below with reference to an example of an embodiment.

FIGS. 1 to 5 show the milking plant according to the invention in five different phases.

Figure 6:
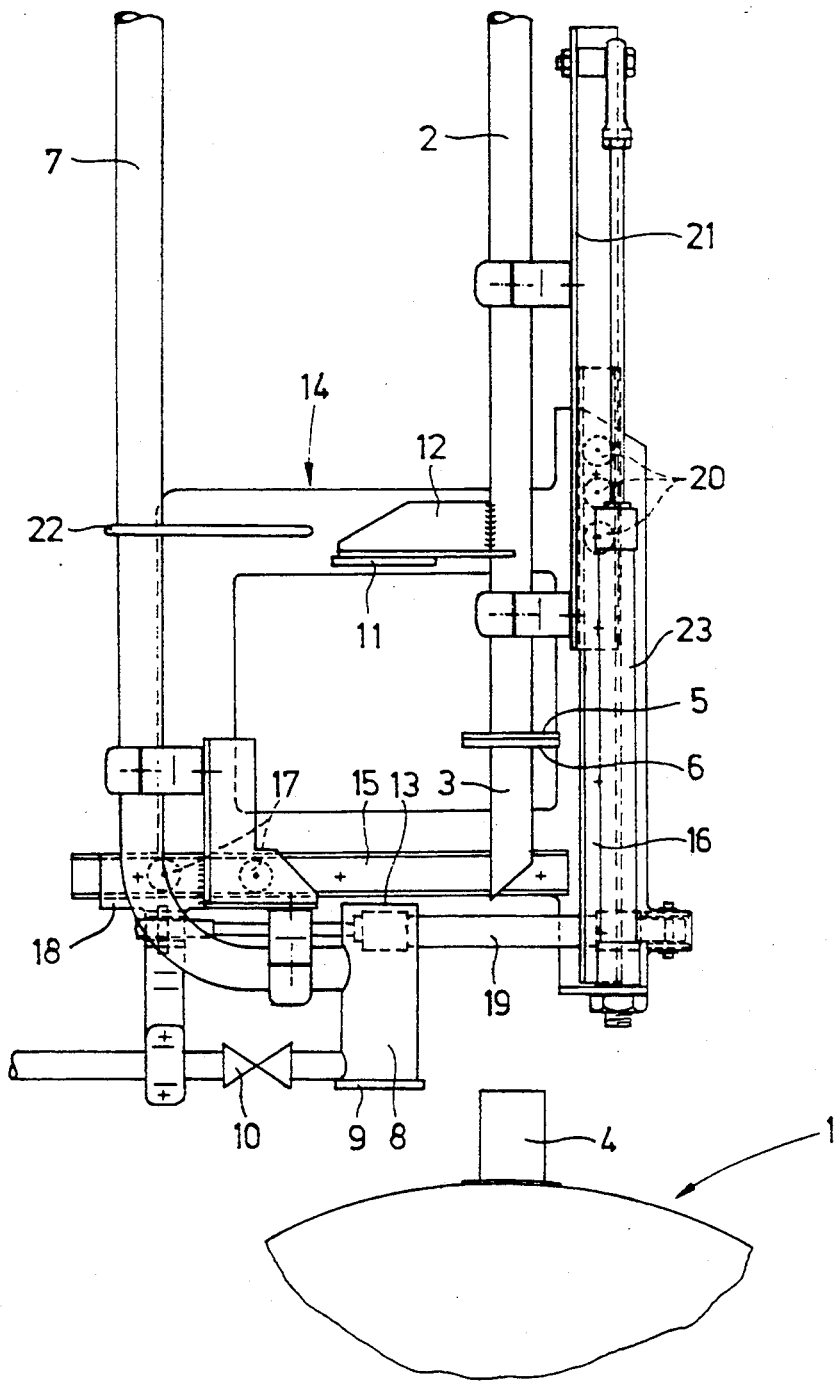
FIG. 6 shows a complete view of the milking plant.

FIG. 1 illustrates a cleaning device according to the invention as a part of a milking plant, inter alia comprising a cooling tank 1 (only a part of which is shown). The milk is supplied to said cooling tank 1 through pressure line 2. For this purpose, the pressure line 2 projects with its nozzle 3 into a pipe section 4, which provides access to the interior of the cooling tank 1. Pressure line 2 bears a radially projecting ring 5, which is provided at the bottom side with a rubber covering 6. In the situation shown in FIG. 1, said rubber covering rests on the open end of the pipe section 4, thereby ensuring a tight connection of pressure line 2 to cooling tank 1.

In the situation shown in FIG. 1, the return line 7 is out of operation. Said return line 7, which is also connected to a washing tank (not shown) bears a connecting pipe section 8, which is open at its top end. At the bottom side the connecting pipe section 8 is shut off by means of bottom 9. Directly above the bottom 9, a discharge valve 10 is connected to the connecting pipe section, the mode of operation of which will be explained later. The open top side of the connecting pipe section is sealed by a cover plate 11, which is fixed by means of arm 12 to the pressure line 2.

In the situation shown in FIG. 1, the milk flows, as indicated by the arrow, through the pressure line 2 to the cooling tank 1. Two to three times a day, and more often if necessary, the pressure line 2 is removed from the cooling tank 1, as shown in FIG. 2. The pressure line 2 is lifted up so high that the bottom part of its nozzle 3 is situated at a higher level than the aperture 13 of the connecting pipe section 8. As shown in FIG. 4, said connecting pipe section 8 can then be pushed in between the nozzle 3 of pressure line 2 and the pipe section 4 of the cooling tank 1. The bottom 9 of the connecting pipe section 8 in this case shuts off the pipe section 4 forming the filling aperture of the cooling tank 1. This means that no contaminants from the outside or cleaning fluid can penetrate into the cooling tank 1 during the cleaning process.

For this purpose, the bottom 9 of the connecting pipe section 8 is provided with a rubber seal at the bottom side. During the cleaning of cooling tank 1, which is generally carried out 3 times a week, the cleaning water return mechanism must be placed in the cleaning position (without the milking machine part of the milking robot necessarily having to be cleaned). Here again, the rubber seal at the bottom side of bottom part 9 of connecting pipe section 8 shuts off filling aperture (pipe section 4) of cooling tank 1, in order to prevent cleaning water with which cooling tank 1 is being cleaned from being lost.

Before the cleaning fluid is passed through the pressure line 2, the latter is moved downwards until the rubber covering 6 comes to rest on the ring 5 on the top edge of the connecting pipe section 8. A tight flow connection is thus obtained between pressure line 2 and return line 7. When a cleaning fluid is now supplied through the pressure line 2, it flows into connecting pipe section 8, and then back out of the connecting pipe section 8 through return line 7; see the arrows.

Since the connection of the return line 7 to the connecting pipe section 8 is situated at a higher level than the aperture of the nozzle 3, the external circumference 3 of the nozzle is also cleaned. For, as soon as the cleaning fluid emerges from the pressure line 2, it hits the bottom 9 of the connecting pipe section, and has to flow up along the external circumference of the nozzle 3, and then be discharged through the return line. Said nozzle 3 comes into contact with splashing milk during filling of the cooling tank 1, so that it is important for the external circumference of the nozzle 3 also to be cleaned.

After the cleaning operations have been carried out, the return line 7 and the pressure line 2 are moved back in reverse order to the position shown in FIG. 1, following which the plant is ready again for milking operation.

The plant is illustrated in greater detail in FIG. 6. FIG. 6 shows a milking plant provided with a frame 14. Said frame 14 is provided with a horizontal roller track 15, and with a vertical roller track 16. A first auxiliary frame 18 can roll along the roller track 15 on rollers 17. The pressure line 17, the connecting pipe section 8, and the discharge valve 10 are fixed to said first auxiliary frame 18. The first auxiliary frame 18 can be moved relative to the frame 14 by means of the piston-cylinder unit 19.

A second auxiliary frame 21 can roll on the rollers 20 relative to the vertical roller track 16 by means of piston-cylinder unit 23. The pressure line 2 is fixed to said second auxiliary frame 21.

The frame 14 is positioned in such a way relative to the pipe section forming the filling aperture 4 of the cooling tank 1 that the nozzle 3 of the pressure line 2 is concentric relative to the pipe section 4. The connecting pipe section 8 is also concentric relative to the pipe section 4, in the position of the connecting pipe section 8 shown in FIGS. 4 and 5.

Finally, a bracket 22, which guides the return line 7 during the to and fro movement thereof, is provided.

After the completion of each cleaning cycle, it is necessary for the remaining water to be able to leave the connecting pipe section 8, pressure line 2 and return line 7. For this purpose, connecting pipe section 8 is provided with a draining facility. This is a pipe which is shut off by means of discharge valve 10 during the cleaning. After each cleaning and each cleaning cycle, discharge valve 10 is opened, so that residues of pre-flushing water, cleaning fluid and rinsing water can leave the connecting pipe section 8, the pressure line 2 and return line 7 under the force of gravity.

I claim:

1. Cleaning device for a liquid treatment plant, said plant having a tank, a pressure line for supplying liquid to the tank, said pressure line having a nozzle movable between a first position in which it is connected to a filling aperture of the tank and a second position not connected to said filling aperture, and means for periodic cleaning of the pressure line, said cleaning device comprising a return line for returning a cleaning fluid supplied through the pressure line, said return line provided with a connecting piece which can be connected to one of the nozzle of the pressure line removed from the filling aperture, in order to form a flow connection between said pressure line and said return line, and the filling aperture, in order to shut off the flow connection between said pressure line and said return line.

2. Device according to claim 1, in which the nozzle of the pressure line is bounded by an outward projecting ring which fits in a sealing manner on one of a pipe section which forms the filling aperture and whose internal diameter is greater than the external diameter of the nozzle and the connecting piece connected to the return line.

3. Milking plant provided with a cleaning device according to claim 1.

4. Cleaning device for a liquid treatment plant, said plant having a tank, a pressure line for supplying liquid to the tank, said pressure line having a nozzle movable between a first position in which it is connected to a filling aperture of the tank and a second position not connected to said filling aperture, and means for periodic cleaning of the pressure line, said cleaning device comprising a return line for returning a cleaning fluid supplied through the pressure line, said return line provided with a connecting piece which can be connected to one of the nozzle of the pressure line removed from the filling aperture, in order to form a flow connection between said pressure line and said return line, and the filling aperture, in order to shut off the flow connection between said pressure line and said return line, wherein the nozzle of the pressure line is bounded by an outward projecting ring which fits in a sealing manner on one of a pipe section which forms the filling aperture and whose internal diameter is greater than the external diameter of the nozzle and the connecting piece connected to the return line, in which the connecting piece is in the form of a connecting pipe section whose internal diameter is greater than the external diameter of the nozzle, which connecting pipe section runs vertically, has an aperture at the top side, on which the ring fits in a sealing manner, and at the bottom side is shut off by a bottom plate which fits in a sealing manner on the pipe section forming the filling aperture.

5. Device according to claim 4, in which the pressure line, at least near the nozzle, is movable vertically between two positions, and the connecting pipe section is movable horizontally between a first position displaced in the transverse direction relative to the pipe section forming the filling aperture and a position directly above that, in such a way that its bottom plate shuts off said pipe section.

6. Device according to claim 5, in which the pressure line is provided with an essentially horizontal cover plate projecting in the direction towards the connecting pipe section, which cover plate rests on the aperture at the top side of the connecting pipe section in the situation in which the nozzle is connected to the pipe section forming the filling aperture, and in which the connecting pipe section is situated in the first position, displaced relative to the filling aperture.

7. Device according to claim 6 in which the return line is connected to the top half of the connecting pipe section.

8. Device according to claim 7 in which a frame is provided, on which frame both the pressure line and the return line with connecting piece are slidably fitted.

9. Device according to claim 8, in which the frame has a horizontal roller track on which a first auxiliary frame can be rolled by means of a piston-cylinder unit, on which first auxiliary frame the return line, the connecting piece and the discharge valve are fitted.

10. Device according to claim 9, in which the frame has a vertical roller track on which a second auxiliary frame can be rolled by means of a piston-cylinder unit, on which second auxiliary frame the pressure line is fitted.

11. Device according to claim 10 in which a control device is provided for automatic operation of the piston-cylinder units and the discharge valve.

12. Device according to claim 4 in which the return line is connected to the top half of the connecting pipe section.

13. Device according to claim 12, in which the connecting pipe section has a discharge valve connected directly above the bottom plate.

* * * * *

UNITED STATES PATENT AND TRADEMARK OFFICE
CERTIFICATE OF CORRECTION

PATENT NO. : 5,415,192
DATED : May 16, 1995
INVENTOR(S) : ANNE PERA

It is certified that error appears in the above-indentified patent and that said Letters Patent is hereby corrected as shown below:   On title page,

At [56] References Cited, change "4,543,494" to --4,534,494--.

Signed and Sealed this

Nineteenth Day of September, 1995

Attest:

BRUCE LEHMAN

Attesting Officer    Commissioner of Patents and Trademarks